(12) United States Patent
Wang et al.

(10) Patent No.: US 9,946,349 B2
(45) Date of Patent: Apr. 17, 2018

(54) SHIFT REGISTER, DRIVING METHOD, GATE DRIVING CIRCUIT AND DISPLAY DEVICE

(71) Applicants: SHANGHAI TIANMA MICRO-ELECTRONICS CO., LTD., Shanghai (CN); TIANMA MICRO-ELECTRONICS CO., LTD., Shenzhen (CN)

(72) Inventors: Lihua Wang, Shanghai (CN); Conghua Ma, Shanghai (CN); Jialing Li, Shanghai (CN); Qijun Yao, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

(*) Notice: Subject to any disclaimer, the term of this patent is extended or adjusted under 35 U.S.C. 154(b) by 256 days.

(21) Appl. No.: 14/850,536

(22) Filed: Sep. 10, 2015

(65) Prior Publication Data
US 2016/0328045 A1  Nov. 10, 2016

(30) Foreign Application Priority Data

May 8, 2015 (CN) .......................... 2015 1 0232736

(51) Int. Cl.
*G06F 3/01* (2006.01)
(52) U.S. Cl.
CPC .................................... *G06F 3/016* (2013.01)

(58) Field of Classification Search
CPC ......... G09G 3/3266; G09G 2310/0286; G09G 2310/0267; G09G 2310/08; G09G 3/2092; G09G 3/3677; G09G 220/0219; G09G 2354/00; G06F 3/0412; G06F 3/016; G06F 3/044; G11C 19/287; G11C 19/00
See application file for complete search history.

(56) References Cited

U.S. PATENT DOCUMENTS

| 2013/0335367 A1* | 12/2013 | Kim | G09G 3/3696 345/174 |
| 2015/0346904 A1* | 12/2015 | Long | G09G 3/3677 345/174 |

(Continued)

*Primary Examiner* — Michael J Jansen, II
*Assistant Examiner* — Ivelisse Martinez Quiles
(74) *Attorney, Agent, or Firm* — Alston & Bird LLP

(57) ABSTRACT

A shift register, a driving method, a gate driving circuit and a display device are provided. The shift register includes a scan control module, an output module, a pull-down module, a turn-off restoring module and a touch control module. The turn-off restoring module is electronically connected to the scan control module at a first node and electronically connected to the touch control module and the output module at a second node. The turn-off restoring module controls the first node to be electrically insulated from the second node during a touch scan phase, and restores a potential of the second node to a potential at a time instant before the touch scan phase when the touch scan phase is finished. The touch control module controls the output module to output a touch scan signal to an output terminal of the shift register during the touch scan phase.

15 Claims, 12 Drawing Sheets

(56) References Cited

U.S. PATENT DOCUMENTS

| | | | |
|---|---|---|---|
| 2016/0049126 A1* | 2/2016 | Zhang | G09G 3/3648 |
| | | | 345/173 |
| 2016/0266699 A1* | 9/2016 | Zhao | G09G 3/3677 |
| 2017/0010731 A1* | 1/2017 | Zhang | G11C 19/28 |
| 2017/0075460 A1* | 3/2017 | Chen | G11C 11/02 |

* cited by examiner

SHIFT REGISTER, DRIVING METHOD, GATE DRIVING CIRCUIT AND DISPLAY DEVICE

CROSS REFERENCE TO RELATED APPLICATIONS

The present application claims the priority to Chinese Patent Application No. 201510232736.6, entitled "SHIFT REGISTER, DRIVING METHOD, GATE DRIVING CIRCUIT AND DISPLAY DEVICE", filed on May 8, 2015 with the State Intellectual Property Office of the PRC, which is incorporated herein by reference in its entirety.

FIELD OF THE INVENTION

The disclosure relates to the technical field of image display, and in particular, to a shift register, a driving method, a gate driving circuit and a display device.

BACKGROUND OF THE INVENTION

At an initial stage of development of the touch display technologies, a touch display panel is fabricated by binding a touch panel and a display panel to implement touch and display functions. The touch panel and the display panel needs to be prepared separately, which may results in great thickness, high cost and low productivity.

With development of a self-capacitive touch-display integration technology, a common electrode layer of an array substrate in the display panel may further serves as a touch electrode layer for self-capacitive touch detection. Touch control and display control may be performed in a time-division mode through a time-division driving, thereby implementing both the touch function and the display function. In this way, touch electrodes are integrated into the display panel directly, which significantly reduces the production cost, enhances the productivity, decrease the thickness of the panel.

In the case where the common electrode further serves as the touch electrodes, the common electrode layer needs to be divided into multiple separate common electrodes. In addition, to implement the touch control and the display control in a time-division mode, each touch electrode is supplied with a signal via a separate touch electrode lead. The touch electrode leads provide corresponding touch electrodes with touch sensing signals during a touch stage and provide the corresponding touch electrodes with display driving voltages during a display stage. However, in an existing self-capacitive touch display device, the load of the touch electrode is relatively large.

BRIEF SUMMARY OF THE INVENTION

A shift register, a driving method, a gate driving circuit and a display device are provided in the disclosure. On the basis of an exiting shift register, the shift register outputs a touch scan signal to a gate line during a touch scan phase; hence, signals applied to the gate line and the touch electrode during the touch scan phase are identical, the parasitic capacitance between the gate line and the touch electrode may be reduced, the load of the touch electrode may be reduced, and the touch performance of the display device may be enhanced.

In general, one aspect of the subject matter described in this specification can be embodied in a shift register that includes a scan control module, an output module, a pull-down module, a turn-off restoring module and a touch control module, the turn-off restoring module being electronically connected to the scan control module at a first node, and being electronically connected to the touch control module and the output module at a second node. The turn-off restoring module is configured to control the first node to be electrically insulated from the second node during a touch scan phase, and to restore a potential of the second node to a potential of the second node at a time instant before the touch scan phase according to a potential of the first node when the touch scan phase is finished. The touch control module is configured to control the output module to output a touch scan signal to an output terminal of the shift register during the touch scan phase.

In general, one aspect of the subject matter described in this specification can be embodied in a driving method for driving the above shift register during the touch scan phase, the method comprising latching the potential of the first node, and electrically insulating the first node from the second node; outputting the touch scan signal; and restoring the potential of the second node to the potential of the second node at the time instant before the touch scan phase according to the potential of the first node.

In general, one aspect of the subject matter described in this specification can be embodied in a gate driving circuit, which includes a first stage shift register to a N-th stage shift register arranged in a first direction, where the first stage shift register to the N-th stage shift register are all the above shift register, where N is an integer greater than 1.

In general, one aspect of the subject matter described in this specification can be embodied in a display device, which includes an array substrate, where the array substrate includes a pixel element array and a gate driving circuit configured to drive the pixel element array, where the gate driving circuit is the above gate driving circuit.

The technical solutions provided according to the disclosure may at least have the following advantages as compared to the prior art.

In the shift register, the driving method, the gate driving circuit and the display device provided in the disclosure, a scan control module, an output module, a pull-down module, a turn-off restoring module and a touch control module are provided. The turn-off restoring module is electronically connected to the scan control module at a first node, and electronically connected to the touch control module and the output module at a second node; and the turn-off restoring module controls the first node to be electrically insulated from the second node during a touch scan phase, and restores a potential of the second node to a potential of the second node at a time instant before the touch scan phase according to a potential of the first node when the touch scan phase is finished; the touch control module controls the output module to output a touch scan signal to an output terminal of the shift register during the touch scan phase.

It can be seen from the above description that, in the technical solutions provided in the disclosure, the turn-off restoring module and the touch control module are provided between the scan control module and the output module. During the touch scan phase, the turn-off restoring module controls the first node to be electrically insulated from the second node; then the touch control module controls the output module to output the touch scan signal to the output terminal of the shift register, such that the touch scan signal may be transmitted to the gate line. In the end of the touch scan phase, the turn-off restoring module restores the potential of the second node to the potential of the second node at the time instant before the touch scan phase to enable the shift register to further proceed to a display scan phase. The shift register outputs the touch scan signal to the gate line during the touch scan phase, such that signals applied to the gate line and the touch electrode during the touch scan phase are identical; hence, the parasitic capacitance between the gate line and the touch electrode may be reduced, the load of the touch electrode may be reduced, and the touch performance of the display device may be enhanced accordingly.

BRIEF DESCRIPTION OF THE DRAWINGS

Drawings to be used in the description of embodiments or the conventional technology are described briefly as follows, so that technical solutions according to the embodiments of the present disclosure or according to the conventional technology may become clearer. It is obvious that the drawings in the following description only illustrate some embodiments of the present disclosure. For those skilled in the art, other drawings may be obtained based on these drawings without any creative work.

DETAILED DESCRIPTION OF THE INVENTION

Technical solutions according to embodiments of the present disclosure are described clearly and completely hereinafter in conjunction with the drawings. It is obvious that the described embodiments are only a part of rather than all of the embodiments according to the present disclosure. Any other embodiments obtained by those skilled in the art based on the embodiments in the present disclosure without any creative work fall in the protection scope of the present disclosure.

As described in the background, the existing self-capacitive touch display device has poor touch performance. The inventor has found that the disadvantage is mainly caused due to reason as follows: a touch electrode and a gate line have an overlapping region, a parasitic capacitance is generated between the gate line and the touch electrode when the display device operates in a touch scan phase; accordingly, a load of the touch electrode is increased, lowering the touch performance of the display device.

Figure 1:
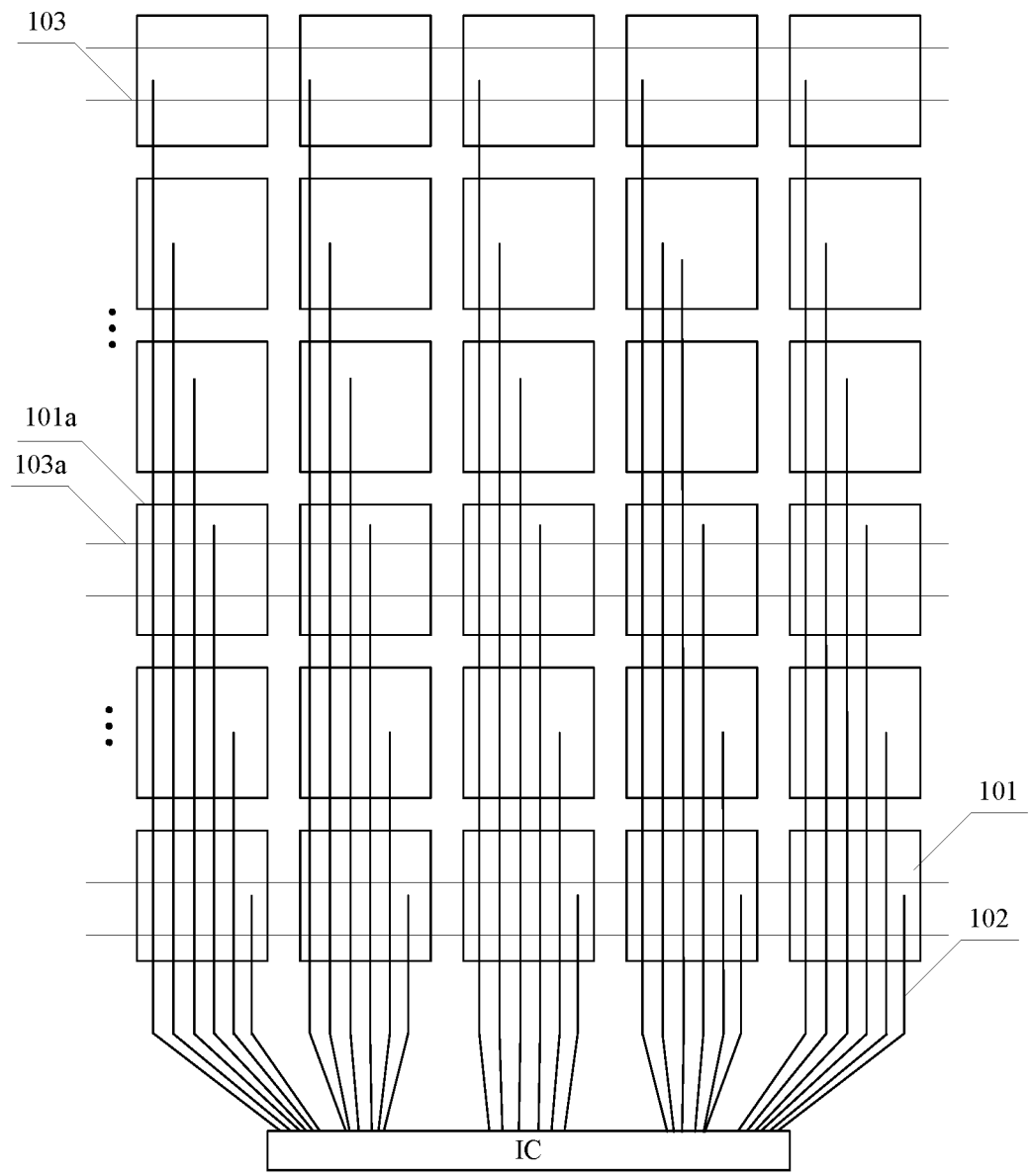
FIG. 1 is a schematic structural diagram of a touch structure on an existing array substrate.

Specifically, FIG. 1 is a schematic structural diagram of a touch structure of an existing array substrate. As shown in FIG. 1, the array substrate includes multiple gate lines 103, and a common electrode which is divided into multiple touch electrodes 101, the multiple touch electrodes 101 are independent from each other, and each touch electrode 101 is electronically connected to a driving circuit IC via a corresponding touch lead 102. The driving circuit IC provides a touch sensing signal to a corresponding touch electrode during a touch phase and provides a common voltage to the corresponding touch electrode during a display phase, the touch sensing signal and the common voltage are transmitted to the touch electrode 101 via the corresponding touch lead 102. Specifically as shown in FIG. 1, explanation is given based on a touch electrode 101a and a touch lead corresponding to the touch electrode 101a. The touch electrode 101a corresponds to a gate line 103a, and signals are transmitted to the touch electrode 101a via a touch lead 102a. A parasitic capacitance exists between the gate line 103a and the touch electrode 101a during the touch scan phase, thereby affecting the accuracy of the touch electrode and lowering the touch performance of the display device.

In view of the above, a shift register is provided according to an embodiment of the disclosure. On the basis of an exiting shift register, the shift register outputs a touch scan signal to the gate line during a touch scan phase; hence, similar signals (for example, with a same frequency but different amplitudes) are applied to the gate line and the touch electrode during the touch scan phase, the parasitic capacitance between the gate line and the touch electrode may be reduced, the load of the touch electrode may be reduced, and accordingly, the touch performance of the display device may be enhanced. The shift register according to the embodiment of the present disclosure is described in detail in conjunction with FIG. 2 to FIG. 9.

Figure 2:
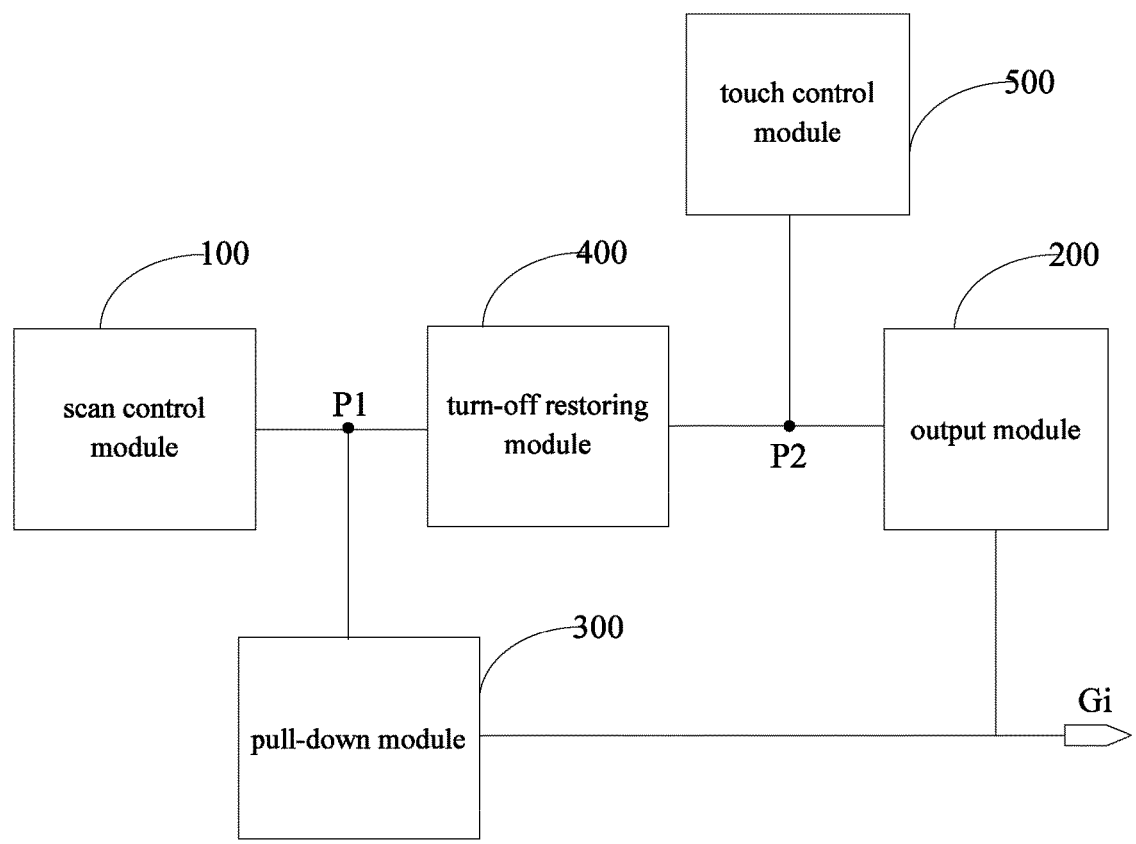
FIG. 2 is a schematic structural diagram of a shift register according to an embodiment of the disclosure.

FIG. 2 is a schematic structural diagram of a shift register according to an embodiment of the disclosure. The shift register includes: a scan control module 100, an output module 200, a pull-down module 300, a turn-off restoring module 400 and a touch control module 500.

The turn-off restoring module 400 is electronically connected to the scan control module 100 at a first node P1, and is electronically connected to the touch control module 500 and the output module 200 at a second node P2.

The turn-off restoring module 400 controls the first node P1 to be electrically insulated from the second node P2 during a touch scan phase; and when the touch scan phase is finished, the turn-off restoring module 400 restores a potential of the second node P2 to a potential of the second node P2 at a time instant before the touch scan phase, according to a potential of the first node P1. The touch control module 500 controls the output module 200 to output a touch scan signal to an output terminal Gi of the shift register, during the touch scan phase.

A display scan phase of the shift register according to the embodiment of the disclosure includes a pre-charge phase, a display output phase and a pull-down phase. During the pre-charge phase, the turn-off restoring module 400 controls the first node P1 to be electronically connected with the second node P2, and the first node P1 is charged by the scan control module 100. Then during the display output phase, the output module 200 is controlled by the scan control module 100 to output a gate turn-on signal to the output terminal Gi of the shift register. Finally, during the pull-down phase, a signal of the first node P1 and the output terminal Gi of the shift register is maintained as a gate turn-off signal by the pull-down module 300. Specifically, during the display scan phase, the turn-off restoring module controls the first node P1 to be electronically connected with the second node P2, and the first node P1 has a same potential with the second node P2.

The touch scan phase of the shift register includes a turn-off phase, a touch output phase and a restoring phase. During the turn-off phase, the turn-off restoring module 400 controls the first node P1 to be electrically insulated from the second node P2, and a current potential of the first node P1 is latched by the scan control module 100. Then during the touch output phase, the output control module 200 is controlled by the touch control module 500 to output a touch scan signal. Finally, during the restoring phase, the turn-off restoring module 400 restores a potential of the second node P2 to a potential of the second node P2 at a time instant before the touch scan phase according to the potential of the first node P1 which is latched by the scan control module 100 during the turn-off phase.

Specifically, an active-high shift register is detailed hereinafter in conjunction with FIG. 2 and FIG. 3a to FIG. 3c, that is, a transistor located in a sub-pixel of the array substrate and electronically connected with the gate line is turned on by a high level.

Figure 3A:
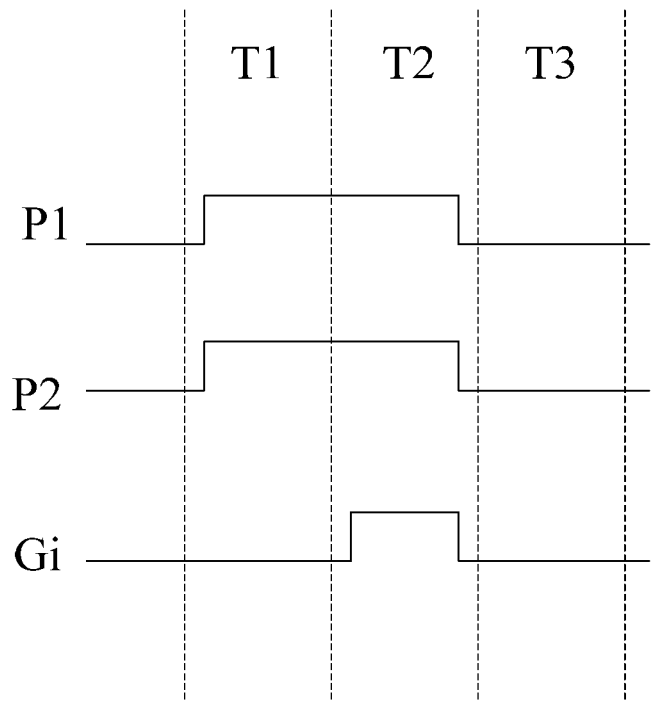
FIG. 3a is a timing diagram of a display scan phase according to an embodiment of the disclosure.

FIG. 3a is a timing diagram of the display scan phase according to an embodiment of the disclosure. The display scan phase includes a pre-charge phase T1, a display output phase T2 and a pull-down phase T3. During the pre-charge phase T1, the turn-off restoring module 400 controls the first node P1 to be electronically connected with the second node P2, and the first node P1 is charged by the scan control module 100; here, the first node P1 and the second node P2 are both at high potential. Then during the display output phase T2, the output module 200 is controlled by the scan control module 100 to output a gate turn-on signal to the output terminal Gi of the shift register; here, the first node P1 is electronically connected with the second node P2 via the turn-off restoring module 400, both the first node P1 and the second node P2 are maintained at high potential by the scan control module 100, and then the output module 200 is controlled by the scan control module 100 to output the gate turn-on signal, i.e., a high potential signal. Finally, during the pull-down phase T3, the signal of the first node P1 and the output terminal Gi of the shift register is maintained, by the pull-down module 300, as a gate turn-off signal, i.e., a low potential signal.

Figure 3B:
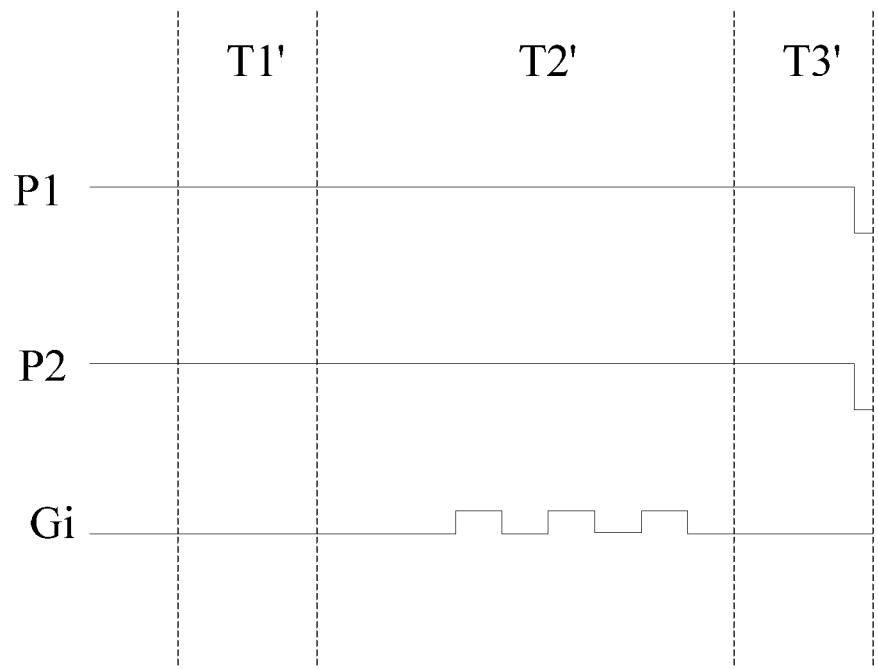
FIG. 3b is a timing diagram of a touch scan phase according to an embodiment of the disclosure.

Further, as shown in FIG. 3b, the touch scan phase of the shift register includes a turn-off phase T1', a touch output phase T2' and a restoring phase T3'. In the case where the touch scan phase is entered between the pre-charge phase T1 and the display output phase T2 of the display scan phase, during the turn-off phase T1', the turn-off restoring module 400 controls the first node P1 to be electrically insulated from the second node P2, and a current potential of the first node P1, which is a high potential, is latched by the scan control module 100; then during the touch output phase T2', the output control module 200 is controlled by the touch control module 500 to output a touch scan signal; in the end of the touch scan phase, i.e., during the restoring phase T3', the turn-off restoring module 400 restores a potential of the second node P2 to a potential of the second node P2 at a time instant before the touch scan phase according to the high potential of the first node P1 latched by the scan control module 100 during the turn-off phase, that is, the second node P2 is restored to a high potential.

Figure 3C:
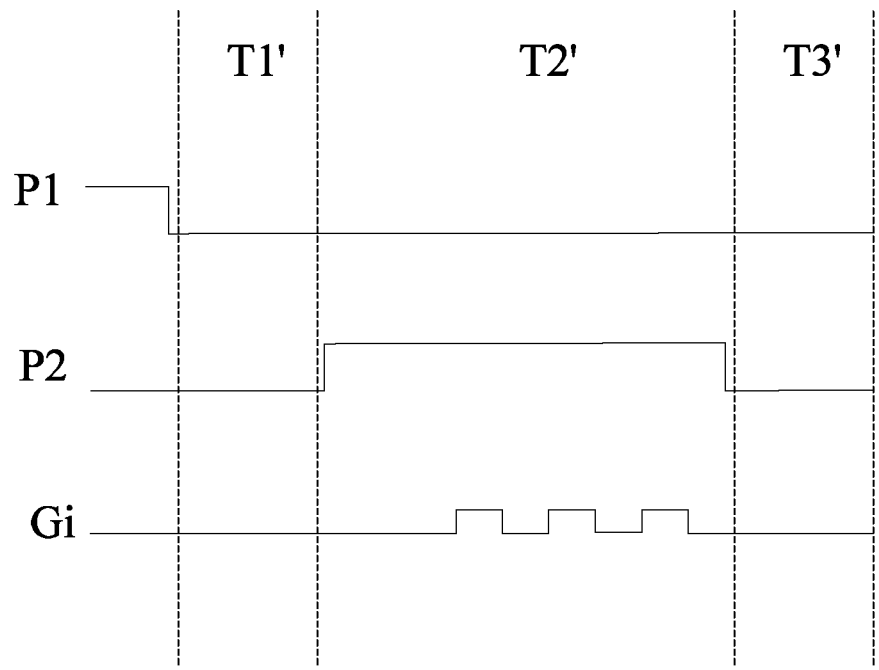
FIG. 3c is a timing diagram of a touch scan phase according to another embodiment of the disclosure.

Alternatively, as shown in FIG. 3c, in the case where the touch scan phase is entered between the display output phase T2 and the pull-down phase T3, during the turn-off phase T1', the turn-off restoring module 400 controls the first node P1 to be electrically insulated from the second node P2, and a potential of the first node P1, which is a low potential, is latched by the scan control module 100; then during the touch output phase T2', the output control module 200 is controlled by the touch control module 500 to output a touch scan signal; in the end of the touch scan phase, i.e., during the restoring phase T3', the turn-off restoring module 400 restores a potential of the second node P2 to a potential of the second node P2 at a time instant before the touch scan phase according to the low potential of the first node P1 latched by the scan control module 100 during the turn-off phase, that is, the second node P2 is restored to a low potential.

It can be seen from the above description that, in the technical solutions according to the embodiments of the disclosure, the turn-off restoring module and the touch control module are provided between the scan control module and the output module. During the touch scan phase, the turn-off restoring module controls the first node to be electrically insulated from the second node; then the touch control module controls the output module to output the touch scan signal to the output terminal of the shift register, such that the touch scan signal may be transmitted to the gate line; in the end of the touch scan phase, the turn-off restoring module restores the potential of the second node to the potential of the second node at the time instant before the touch scan phase to enable the shift register to proceed to the display scan phase. The touch scan signal is outputted from the shift register to the gate line during the touch scan phase, such that signals applied to the gate line and the touch electrode are identical during the touch scan phase, the parasitic capacitance between the gate line and the touch electrode may be reduced, the load may be reduced, and accordingly, the touch performance of the display device may be enhanced.

Figure 4:
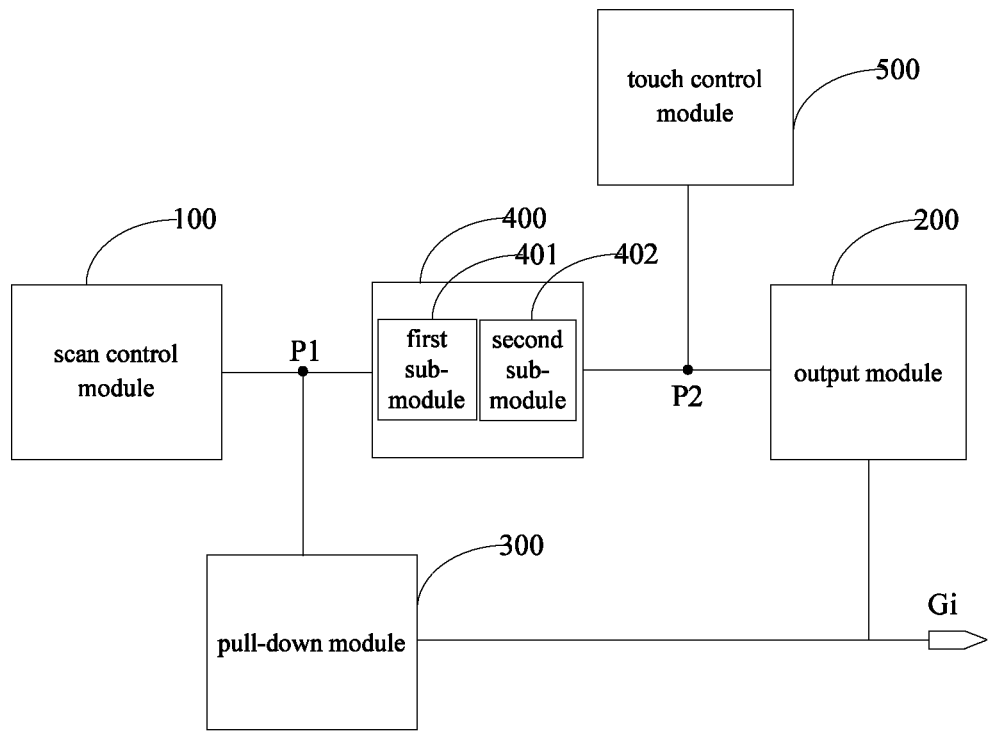
FIG. 4 is a schematic structural diagram of a shift register according to an embodiment of the disclosure.

FIG. 4 is a schematic structural diagram of a shift register according to another embodiment of the disclosure.

In embodiments, the turn-off restoring module 400 includes a first sub-module 401 and a second sub-module 402. In embodiments, the first sub-module 401 controls the first node P1 to be electrically insulated from the second node P2 during the touch scan phase, and controls the first node P1 to be electronically connected with the second node P2 during the display scan phase. When the touch scan phase is finished, the second sub-module 402 restores the potential of the second node P2 to the potential of the second node P2 at the time instant before the touch scan phase according to the potential of the first node P1.

Figure 5:
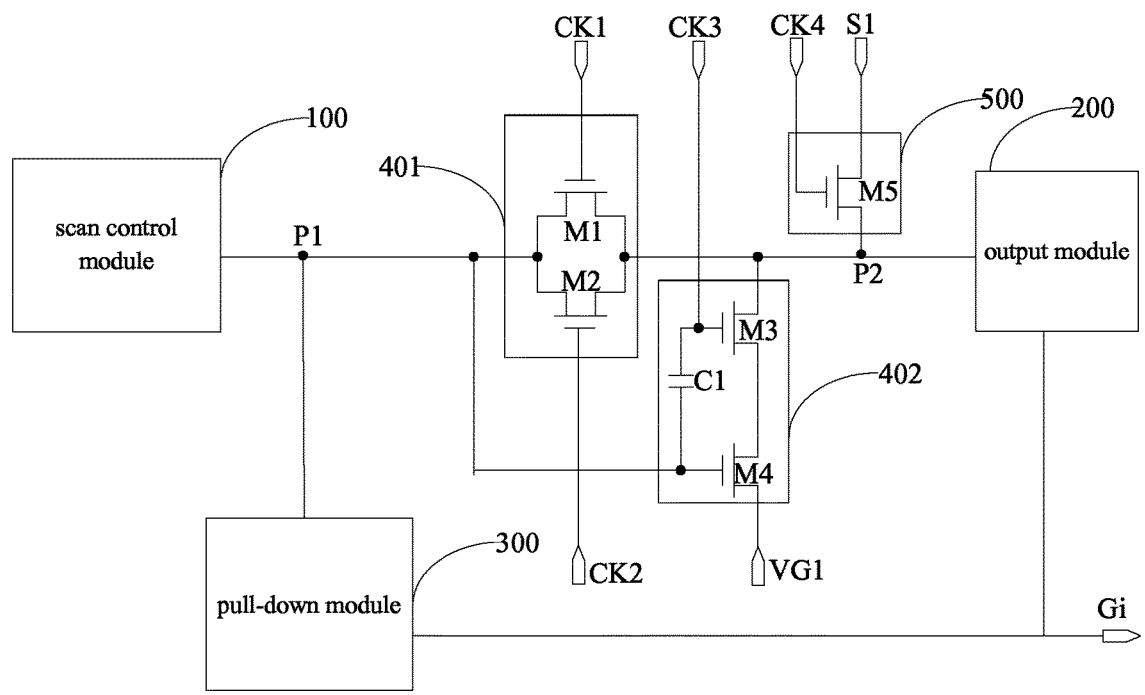
FIG. 5 is a schematic structural diagram of a shift register according to an embodiment of the disclosure.

Particularly, FIG. 5 is a schematic structural diagram of a shift register according to yet another embodiment of the disclosure. The first sub-module 401 comprises a first transistor M1, a second transistor M2, a first control signal terminal CK1 and a second control signal terminal CK2.

A first terminal of a first transistor M1 and a first terminal of a second transistor M2 are both electronically connected to the first node, a second terminal of the first transistor M1 and a second terminal of the second transistor M2 are both electronically connected to the second node, a control terminal of the first transistor M1 is electronically connected to the first control signal terminal CK1, and a control terminal of the second transistor M2 is electronically connected to the second control signal terminal CK2. Further, the second sub-module 402 according to the embodiment of the disclosure includes a third transistor M3, a fourth transistor M4, a first capacitor C1, a third control signal terminal CK3 and a first level terminal VG1.

Specifically, a first terminal of the third transistor M3 is electronically connected to a second terminal of the fourth transistor M4, a second terminal of the third transistor M3 is electronically connected to the second node, a control terminal of the third transistor M3 and a first plate of the first capacitor C1 are both electronically connected to the third control signal terminal CK3, a first terminal of the fourth transistor M4 is electronically connected to the first level terminal VG1, and a control terminal of the fourth transistor M4 and a second plate of the first capacitor C1 are both electronically connected to the first node.

Further, as shown in FIG. 5, the touch control module 500 according to the embodiment of the disclosure includes a fifth transistor M5, a fourth control signal terminal CK4 and a first signal terminal S1. In embodiments, where a first terminal of the fifth transistor M5 is electronically connected to the first signal terminal S1, a second terminal of the fifth transistor M5 is electronically connected to the second node, and a control terminal of the fifth transistor M5 is electronically connected to the fourth control signal terminal CK4.

Figure 6:
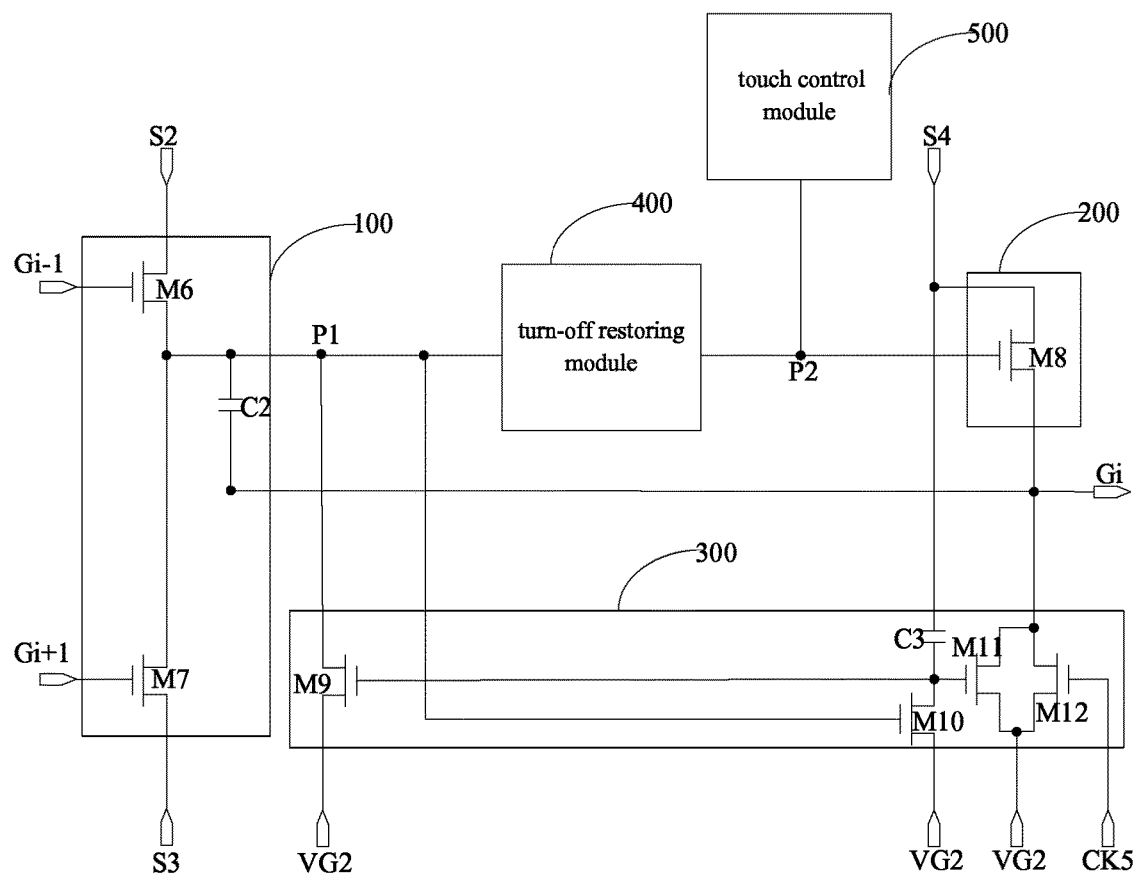
FIG. 6 is a schematic structural diagram of a shift register according to an embodiment of the disclosure.

Further, FIG. 6 is a schematic structural diagram of a shift register according to yet another embodiment of the disclosure. The scan control module 100 according to the embodiment of the disclosure includes a sixth transistor M6, a seventh transistor M7, a second capacitor C2, a first input terminal Gi−1 and a second input terminal Gi+1.

A first terminal of the sixth transistor M6 is electronically connected to a second signal terminal S2; a second terminal of the sixth transistor M6, a second terminal of the seventh transistor M7 and a first plate of the second capacitor C2 are all electronically connected to the first node; a first terminal of the seventh transistor M7 is electrically connected to the third signal terminal S3; a control terminal of the sixth transistor M6 is electronically connected to the first input terminal Gi−1; a control terminal of the seventh transistor M7 is electronically connected to the second input terminal Gi+1; and a second plate of the second capacitor C2 is electronically connected to the output terminal Gi of the shift register. Particularly, in the scan control module, the first input terminal is an output terminal of a shift register of a preceding stage, and the second input terminal is an output terminal of a shift register of a next stage.

As shown in FIG. 6, the output module 200 according to the embodiment of the disclosure includes an eighth transistor M8 and a fourth signal terminal S4. In embodiments, a first terminal of the eighth transistor M8 is electronically connected to the fourth signal terminal S4, a second terminal of the eight transistor M8 is electronically connected to the output terminal Gi of the shift register, and a control terminal of the eighth transistor M8 is electronically connected to the second node.

In order to reduce the number of terminals and optimize the area occupied by the shift register, according to an embodiment of the disclosure, the first control signal terminal CK1 and the fourth signal terminal S4 are a same signal terminal, and the touch scan signal outputted from the fourth signal terminal S4 is lower than a threshold voltage of the first transistor M1 during the touch scan phase.

As shown in FIG. 6, the pull-down module 300 according to the embodiment of the disclosure includes a ninth transistor M9, a tenth transistor M10, an eleventh transistor M11, a twelfth transistor M12, a third capacitor C3 and a second level terminal VG2. In embodiments, a first terminal of the ninth transistor M9, a first terminal of the tenth transistor M10, a first terminal of the eleventh transistor M11, and a first terminal of the twelfth transistor M12 are all electronically connected to the second level terminal VG2; a second terminal of the ninth transistor M9 and a control terminal of the tenth transistor M10 are both electronically connected to the first node; a control terminal of the ninth transistor M9, a second terminal of the tenth transistor M10, a control terminal of the eleventh transistor M11 and a second plate of the third capacitor C3 are electronically connected to each other; and a first plate of the third capacitor C3 is electronically connected to the fourth signal terminal S4; and a second terminal of the eleventh transistor M11 and a second terminal of the twelfth transistor M12 are both electronically connected to the output terminal Gi of the shift register, and a control terminal of the twelfth transistor M12 is electronically connected to a fifth control signal terminal CK5.

In order to reduce the number of terminals and optimize the area occupied by the shift register, according to an embodiment of the disclosure, the first transistor M1, the second transistor M2 and the twelfth transistor M12 are of a same type, and the fifth control signal terminal CK5 and the second control signal terminal CK2 are a same signal terminal; and during the display scan phase, a clock signal outputted from the fifth control signal terminal CK5 and a clock signal outputted from the first control signal terminal CK1 are opposite, i.e., having the same frequency and opposite electrical levels.

It should be noted that, types of the transistors in the above shift registers are not specifically limited in the embodiments of the disclosure, and the types may be selected according to practical application.

Figure 7:
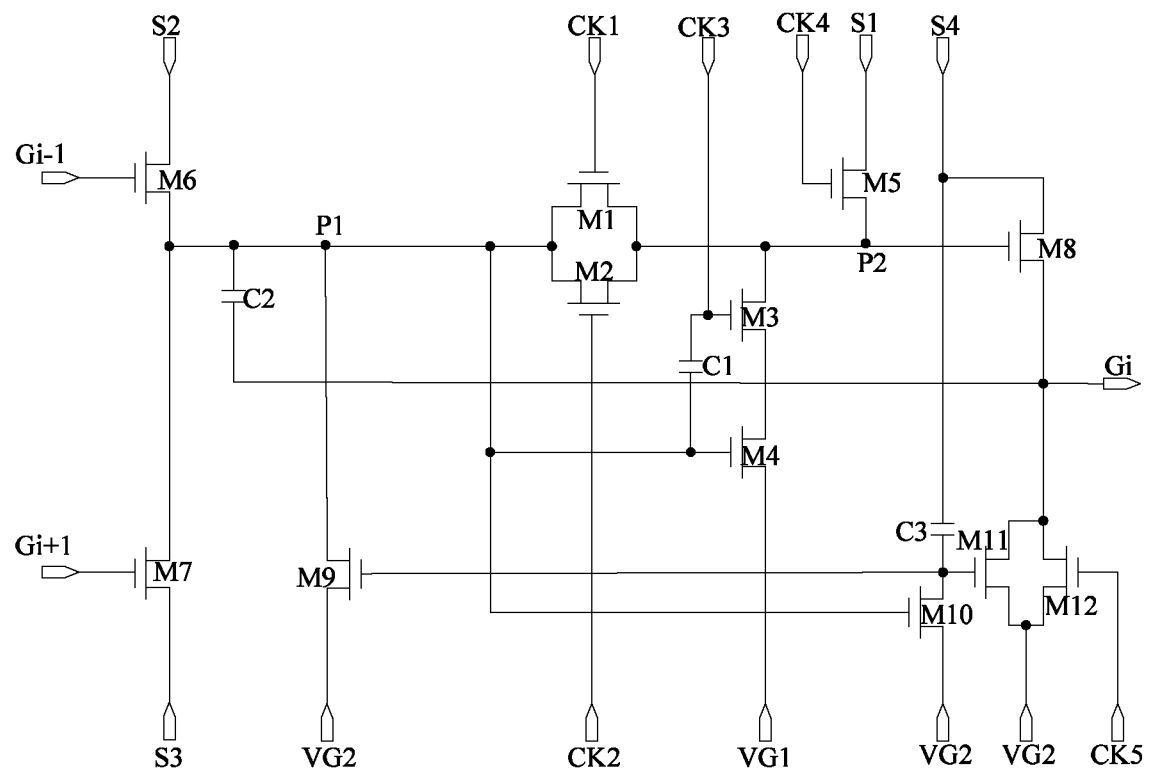
FIG. 7 a schematic structural diagram of a shift register according to an embodiment of the disclosure.
Figure 8:
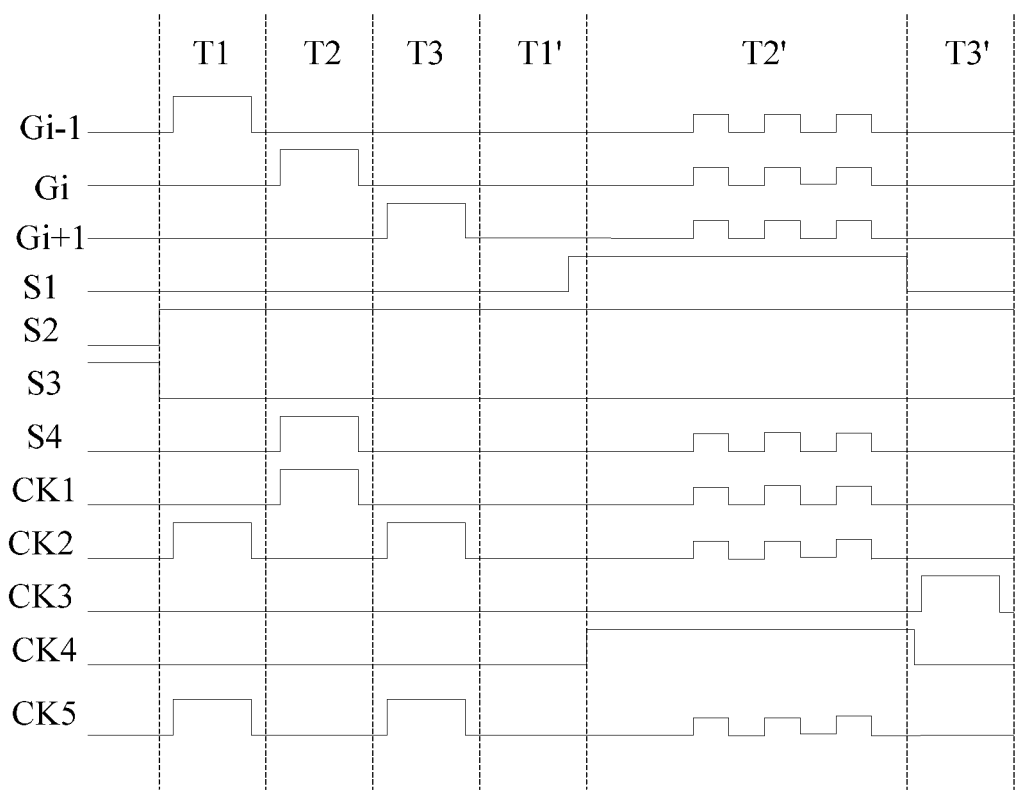
FIG. 8 is a timing diagram according to an embodiment of the disclosure.

Hereinafter, a shift register according to an embodiment of the disclosure is described in detail based on specific circuit structure of the shift register and timing. Reference is made to FIG. 7 and FIG. 8, where FIG. 7 is a schematic structural diagram of a shift register according to an embodiment of the disclosure, and FIG. 8 is a timing diagram according to an embodiment of the disclosure.

FIG. 7 illustrates a shift register which combines the structures described in FIG. 5 and FIG. 6, here it is explained based on a case that the shift register is an active-high shift register. A first transistor M1 to a twelfth transistor M12 are all N-type transistors; a first control signal terminal CK1 and a fourth signal terminal S4 are a same signal terminal, that is, a signal outputted from the first control signal terminal CK1 has a same timing with a signal outputted from the fourth signal terminal S4; a second control signal terminal CK2 and a fifth control signal terminal CK5 are a same signal terminal, that is, a signal outputted from the second control signal terminal CK2 has a same timing with a signal outputted from the fifth control signal terminal CK5. Further, a first level terminal VG1 outputs a high potential signal, and a second level terminal VG2 outputs a low potential signal.

As shown in FIG. 8, a display scan phase Display includes a pre-charge phase T1, a display output phase T2 and a pull down phase T3.

During the pre-charge phase T1, a high potential signal is outputted from a first input terminal Gi−1 to turn on a sixth transistor M6; at the same time, a high potential signal is outputted from a second signal terminal S2 to charge a second capacitor C2, that is, a first node P1 is charged as well; a high potential signal is outputted from the second control signal terminal CK2 to turn on a second transistor M2, such that the first node P1 is electronically connected with the second node P2; since the first node P1 is electronically connected with the second node P2, the second node P2 is at a high potential, the eighth transistor M8 is controlled to be turned on, and accordingly, a low potential signal from the fourth signal terminal S4 is output to an output terminal Gi of the shift register.

Then, during the display output phase T2, a low potential signal is outputted from the first input terminal Gi−1 and the second capacitor C2 bootstraps to enable the first node P1 to be at a high potential; at the same time, a high potential signal is outputted from the first control signal terminal CK1 to control the first transistor M1 to be turned on, here, the second node P2 and the first node P1 are both at high potential; the eighth transistor M8 is controlled to be turned on through the second node P2, and accordingly, a high potential signal from the fourth signal terminal S4 is output to the output terminal Gi of the shift register; and at this moment, a third capacitor C3 is charged by the high potential signal outputted from the fourth signal terminal S4.

Finally, during the pull-down phase T3, a high potential signal is outputted from a second input terminal Gi+1 to control a seventh transistor M7 to be turned on, and accordingly, a low potential signal from a third signal terminal S3 is transmitted to the first node P1; a high potential signal is outputted from the second control signal terminal CK2 to control the second transistor M2 to be turned on, and accordingly, a potential of the first node P1 may be transmitted to the second node P2; and at this moment, the third capacitor C3 discharges to control the ninth transistor M9 and the eleventh transistor M11 to be turned on, and the twelfth transistor M12 is controlled to be turned on by a high potential signal outputted from the fifth control signal terminal CK5, such that a low potential signal outputted from the second level terminal VG2 is transmitted to the first node P1 and the output terminal Gi of the shift register.

As shown in FIG. 8, a touch scan phase TP includes a turn-off phase T1', a touch output phase T2' and a restoring phase T3'.

During the turn-off phase T1', the first control signal terminal CK1 and the second control signal terminal CK2 both output low potential signals to respectively control the first transistor M1 and the second transistor M2 to be turn off, that is, the first node is electrically insulated from the second node P2; at this moment, a potential of the first node P1 is latched by the second capacitor C2.

Then during the touch output phase T2', a high potential signal is outputted from the fourth control signal terminal CK4 to control the fifth transistor M5 to be turned on, and accordingly, a high potential signal outputted from the first signal terminal S1 is transmitted to the second node P2; the eighth transistor M8 is controlled to be turned on by the high potential of the second node P2, and accordingly, a touch scan signal outputted from the fourth signal terminal S4 is outputted to the output terminal Gi of the shift register. Specifically, during a preset time interval after the touch scan signal is outputted in the touch output phase T2' and before the restoring phase T3', a low potential signal outputted from the first signal terminal S1 is transmitted to the second node P2 through the fifth transistor M5, to make the second node P2 to be at a low potential.

Finally, during the restoring phase T3', a low potential signal is outputted form the fourth control signal terminal CK4 to control the fifth transistor M5 to be turned off, and the second node P2 may be maintained at a low potential; and a potential of the second node is restored to a potential of the second node P2 at a time instant before the touch scan phase according to the potential of the first node P1 latched by the second capacitor C2 during the turn-off phase. For example, in the case where the touch scan phase is entered between the pre-charge phase T1 and the display output phase T2 of the display scan phase, the latched potential of the first node P1 is a high potential, which controls the fourth transistor M4 to be turned on. At this moment, a high potential signal is outputted from the third control signal terminal CK3 to control the third transistor M3 to be turned on, and a high potential signal outputted from the first level terminal VG1 is outputted to the second node P2 through the third transistor M3 and the fourth transistor M4; hence, the potential of the second node P2 is restored to a potential of the second node P2 at a time instant before the touch scan phase, i.e., restored to a high potential.

Alternatively, in the case where the touch scan phase is entered between the display output phase T2 and the pull-down phase T3, the latched potential of the first node P1 is a low potential, the third transistor M3 is controlled to be turned on by a high potential signal outputted from the third control signal terminal CK3, and the fourth transistor M4 is controlled to be turned off by the low potential of the first node P1; hence, the potential of the second node P2 is maintained at a low potential, i.e., restored to the potential of the second node P2 at a time instant before the touch scan phase.

Figure 9:
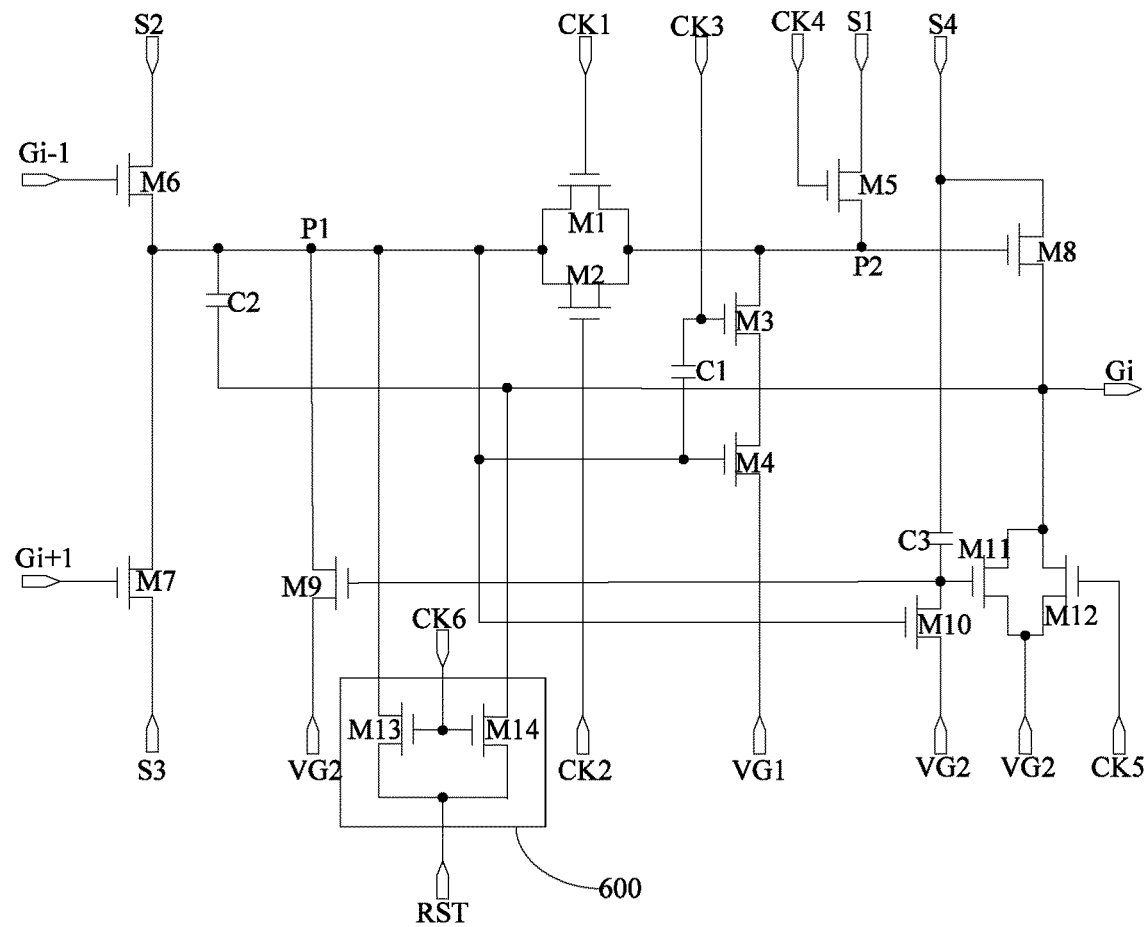
FIG. 9 is a schematic structural diagram of a shift register according to an embodiment of the disclosure.

Further, to ensure the accuracy of a signal transmitted when the display device is just started, a signal in the scan circuit needs to be reset at start up. FIG. 9 is a schematic structural diagram of a shift register according to yet another embodiment of the disclosure. The shift register according to the embodiment of the disclosure further includes a reset module 600, where the reset module is electronically connected to the first node P1 and the output terminal Gi of the shift register, and is used to reset a potential of the first node P1 and a potential of the output terminal Gi of the shift register.

The reset module 600 includes a thirteenth transistor M13, a fourteenth transistor M14, a sixth control signal terminal CK6 and a reset signal terminal RST.

A first terminal of the thirteenth transistor M13 and a first terminal of the fourteenth transistor M14 are both electronically connected to the reset signal terminal RST, a control terminal of the thirteenth transistor M13 and a control terminal of the fourteenth transistor M14 are both electronically connected to the sixth control signal terminal CK6, a second terminal of the thirteenth transistor M13 is electronically connected to the first node, and a second terminal of the fourteenth transistor M14 is electronically connected to the output terminal Gi of the shift register. Preferably, in order to reduce the number of terminals and optimize the shift register, according to an embodiment of the disclosure, the reset signal terminal and the second level terminal are a same signal terminal.

Figure 10:
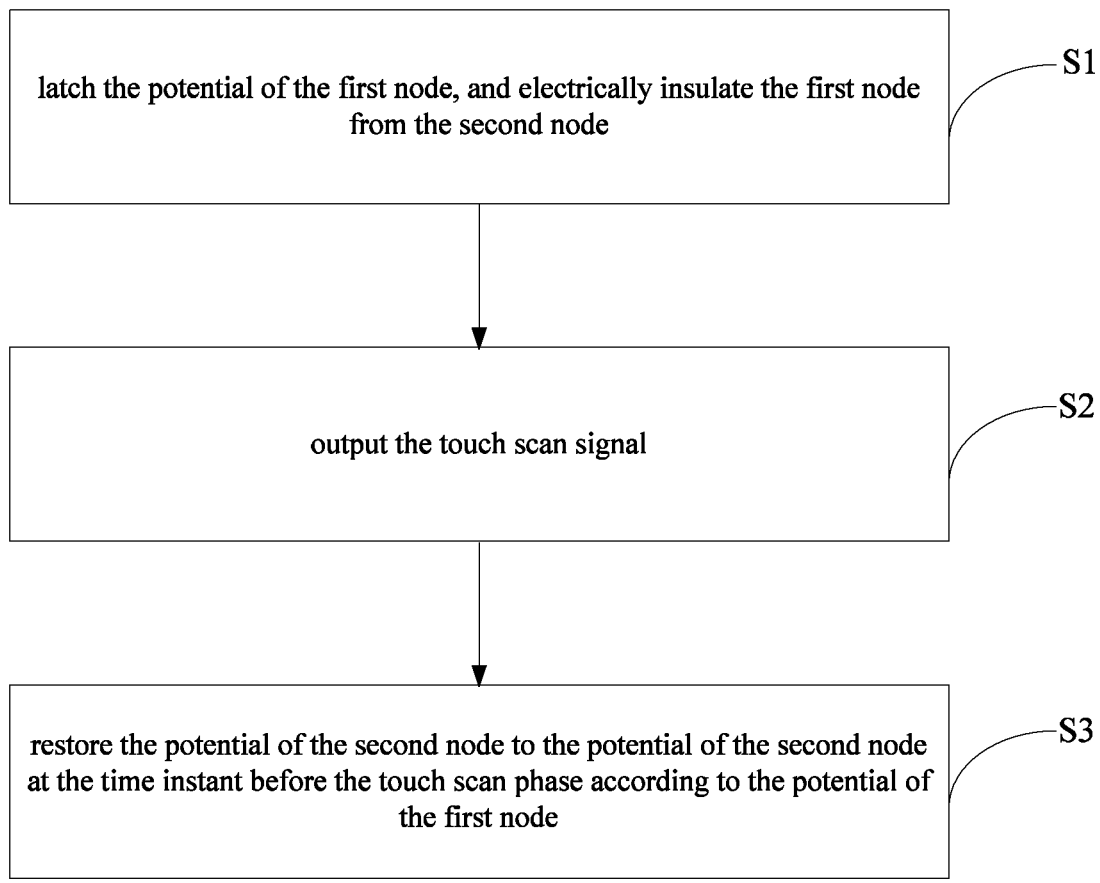
FIG. 10 is a flow chart of a driving method according to an embodiment of the disclosure.

Accordingly, a driving method is provided according to an embodiment of the disclosure, for driving the shift register according to any one of the above embodiments. FIG. 10 is a flow chart of a driving method according to an embodiment of the disclosure, where during the touch scan phase, the method includes the following steps S1 to S3.

In step S1, a potential of the first node is latched, and meanwhile the first node is electrically insulated from the second node.

In step S2, a touch scan signal is outputted.

In step S3, a potential of the second node is restored to a potential of the second node at a time instant before the touch scan phase according to the potential of the first node.

Figure 11:
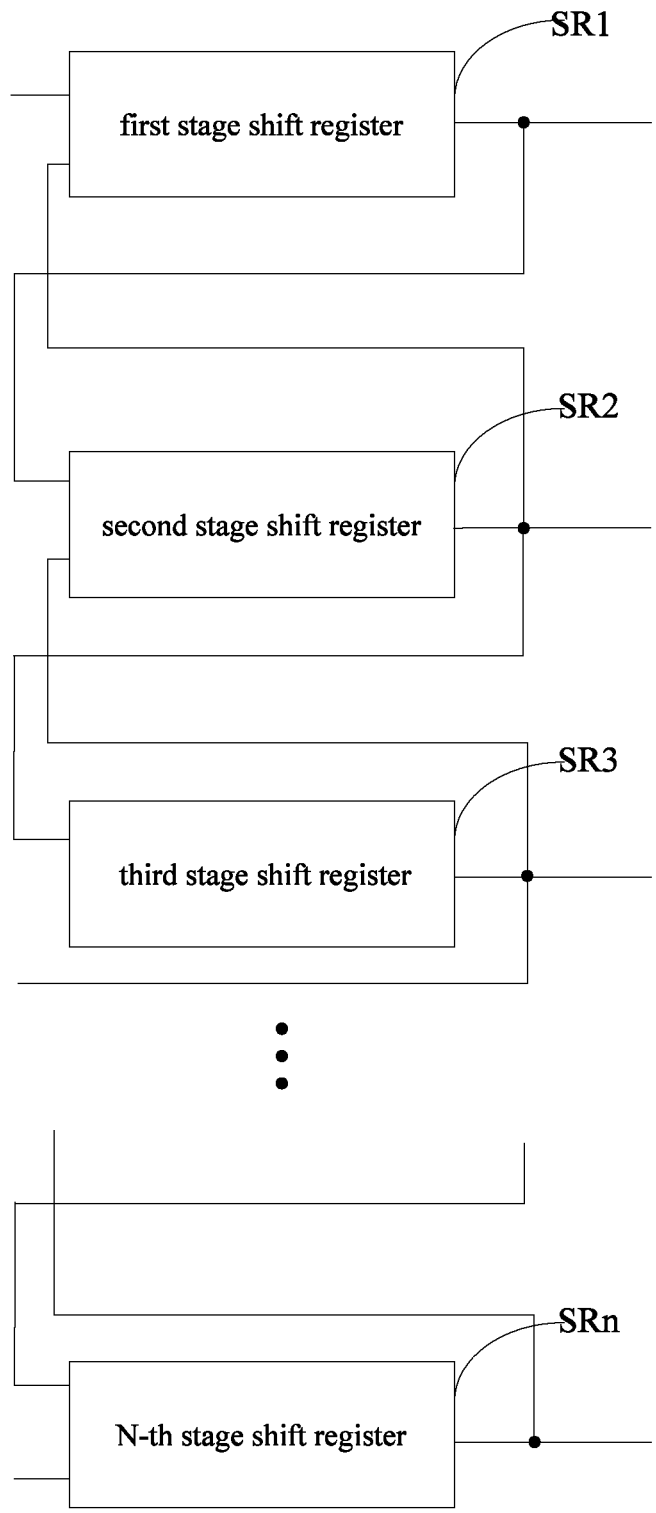
FIG. 11 is a schematic structural diagram of a gate driving circuit according to an embodiment of the disclosure.

Accordingly, a gate driving circuit is provided according to an embodiment of the disclosure. FIG. 11 is a schematic structural diagram of a gate driving circuit according to an embodiment of the disclosure. The gate driving circuit includes a first stage shift register SR1 to a N-th stage shift register SRn which are arranged in a first direction Y, and the first stage shift register SRI to the N-th stage shift register SRn are all the shift register according to any one of the above embodiments, where N is an integer greater than 1.

An output terminal of a shift register of a former stage is electronically connected to a first input terminal of a shift register of a latter stage, and an output terminal of the shift register of the latter stage is electronically connected to a second input terminal of the shift register of the former stage. It should be noted that, a first input terminal of the first stage shift register and a second input terminal of the N-th stage shift register are electronically connected to signal terminals of the first stage shift register and the N-th stage shift register, respectively.

Figure 12:
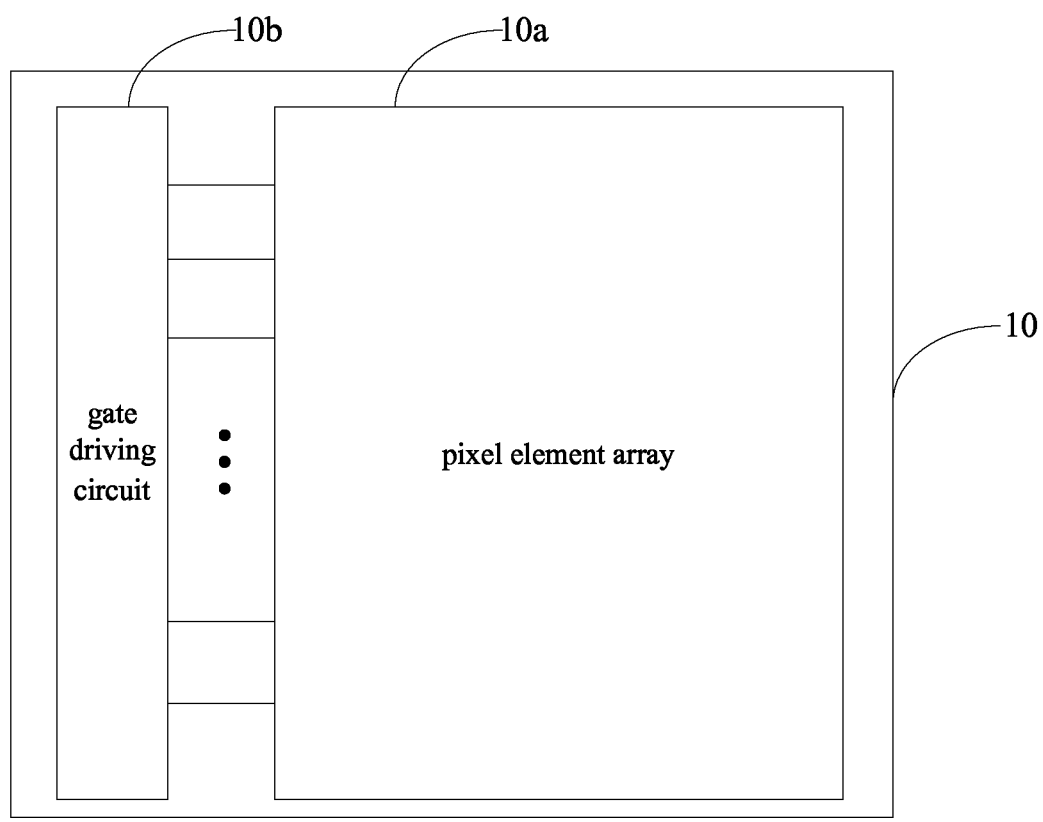
FIG. 12 is a schematic structural diagram of a display device according to an embodiment of the disclosure.

Finally, a display device is further provided according to an embodiment of the disclosure. FIG. 12 is a schematic structural diagram of a display device according to an embodiment of the disclosure. The display device includes an array substrate 10. The array substrate 10 includes a pixel element array 10a and a gate driving circuit 10b for driving the pixel element array, where the gate driving circuit 10b is the gate driving circuit according to the above embodiment.

In the shift register, the driving method, the gate driving circuit and the display device provided in the disclosure, a scan control module, an output module, a pull-down module, a turn-off restoring module and a touch control module are provided. The turn-off restoring module is electronically connected to the scan control module at a first node, and electronically connected to the touch control module and the output module at a second node; and the turn-off restoring module controls the first node to be electrically insulated from the second node during a touch scan phase, and restores a potential of the second node to a potential of the second node at a time instant before the touch scan phase according to a potential of the first node when the touch scan phase is finished; the touch control module controls the output module to output a touch scan signal to an output terminal of the shift register during the touch scan phase.

It can be seen from the above description that, in the technical solutions according to the embodiments of the disclosure, the turn-off restoring module and the touch control module are provided between the scan control module and the output module. During the touch scan phase, the turn-off restoring module controls the first node to be electrically insulated from the second node; then the touch control module controls the output module to output the touch scan signal to the output terminal of the shift register, such that the touch scan signal may be transmitted to the gate line; in the end of the touch scan phase, the turn-off restoring module restores the potential of the second node to the potential of the second node at the time instant before the touch scan phase to enable the shift register to further proceed to a display scan phase. The shift register outputs the touch scan signal to the gate line during the touch scan phase, such that signals applied to the gate line and the touch electrode during the touch scan phase are identical; hence, the parasitic capacitance between the gate line and the touch electrode may be reduced, the load of the touch electrode may be reduced, and the touch performance of the display device may be enhanced accordingly.

With the above descriptions of the disclosed embodiments, the skilled in the art may achieve or use the present disclosure. Various modifications to the embodiments are apparent for the skilled in the art. The general principle herein can be implemented with other embodiments without departing from the spirit or scope of the disclosure. Therefore, the present disclosure should not be limited to the embodiments disclosed herein, but has the widest scope that is in conformity with the principle and the novel features disclosed herein.

What is claimed is:

1. A shift register, comprising a scan control module, an output module, a pull-down module, a turn-off restoring module and a touch control module, wherein the turn-off restoring module is electronically connected to the scan control module at a first node, and is electronically connected to the touch control module and the output module at a second node; and the turn-off restoring module controls the first node to be electrically insulated from the second node during a touch scan phase, and restores a potential of the second node to a potential of the second node at a time instant before the touch scan phase according to a potential of the first node when the touch scan phase is finished; and the touch control module controls the output module to output a touch scan signal to an output terminal of the shift register during the touch scan phase.

2. The shift register of claim 1, wherein during a display scan phase, the turn-off restoring module controls the first node to be electronically connected with the second node, and the first node has a same potential as the second node.

3. The shift register of claim 2, wherein the turn-off restoring module comprises a first sub-module and a second sub-module, wherein the first sub-module controls the first node to be electrically insulated from the second node during the touch scan phase, and controls the first node to be electronically connected with the second node during the display scan phase; and the second sub-module restores, when the touch scan phase is finished, the potential of the second node to the potential of the second node at the time instant before the touch scan phase according to the potential of the first node.

4. The shift register of claim 3, wherein the first sub-module comprises a first transistor, a second transistor, a first control signal terminal and a second control signal terminal;

wherein a first terminal of the first transistor and a first terminal of the second transistor are both electronically connected to the first node, a second terminal of the first transistor and a second terminal of the second transistor are both electronically connected to the second node, a control terminal of the first transistor is electronically connected to the first control signal terminal, and a control terminal of the second transistor is electronically connected to the second control signal terminal.

5. The shift register of claim 3, wherein the second sub-module comprises a third transistor, a fourth transistor, a first capacitor, a third control signal terminal and a first level terminal;

wherein a first terminal of the third transistor is electronically connected to a second terminal of the fourth transistor, a second terminal of the third transistor is electronically connected to the second node, a control terminal of the third transistor and a first plate of the first capacitor are both electronically connected to the third control signal terminal, a first terminal of the fourth transistor is electronically connected to the first level terminal, and a control terminal of the fourth transistor and a second plate of the first capacitor are both electronically connected to the first node.

6. The shift register of claim 4, wherein the output module comprises an eighth transistor and a fourth signal terminal; wherein a first terminal of the eighth transistor is electronically connected to the fourth signal terminal, a second terminal of the eight transistor is electronically connected to the output terminal of the shift register, and a control terminal of the eighth transistor is electronically connected to the second node.

7. The shift register of claim 6, wherein the first control signal terminal and the fourth signal terminal are a same signal terminal, and the touch scan signal outputted from the fourth signal terminal is lower than a threshold voltage of the first transistor during the touch scan phase.

8. The shift register of claim 6, wherein the pull-down module comprises a ninth transistor, a tenth transistor, an eleventh transistor, a twelfth transistor, a third capacitor, a fifth control signal terminal and a second level terminal; wherein a first terminal of the ninth transistor, a first terminal of the tenth transistor,
a first terminal of the eleventh transistor, and a first terminal of the twelfth transistor are all electronically connected to the second level terminal; a second terminal of the ninth transistor and a control terminal of the tenth transistor are both electronically connected to the first node; a control terminal of the ninth transistor, a second terminal of the tenth transistor, a control terminal of the eleventh transistor and a second plate of the third capacitor are electronically connected to each other; and a first plate of the third capacitor is electronically connected to the fourth signal terminal; and
a second terminal of the eleventh transistor and a second terminal of the twelfth transistor are both electronically connected to the output terminal of the shift register, and a control terminal of the twelfth transistor is electronically connected to the fifth control signal terminal.

9. The shift register of claim 8, wherein the first transistor, the second transistor and the twelfth transistor are of a same type, and the fifth control signal terminal and the second control signal terminal are a same signal terminal; and
during the display scan phase, a clock signal outputted from the fifth control signal terminal and a clock signal outputted from the first control signal terminal are opposite.

10. The shift register of claim 1, wherein the touch control module comprises a fifth transistor, a fourth control signal terminal and a first signal terminal;
wherein a first terminal of the fifth transistor is electronically connected to the first signal terminal, a second terminal of the fifth transistor is electronically connected to the second node, and a control terminal of the fifth transistor is electronically connected to the fourth control signal terminal.

11. The shift register of claim 1, wherein the scan control module comprises a sixth transistor, a seventh transistor, a second capacitor, a second signal terminal, a third signal terminal, a first input terminal and a second input terminal;
wherein a first terminal of the sixth transistor is electronically connected to the second signal terminal; a second terminal of the sixth transistor, a second terminal of the seventh transistor and a first plate of the second capacitor are all electronically connected to the first node; a first terminal of the seventh transistor is electronically connected to the third signal terminal; a control terminal of the sixth transistor is electronically connected to the first input terminal; a control terminal of the seventh transistor is electronically connected to the second input terminal; and a second plate of the second capacitor is electronically connected to the output terminal of the shift register.

12. The shift register of claim 1, further comprising a reset module, wherein the reset module is electronically connected to the first node and the output terminal of the shift register, and resets a potential of the first node and a potential of the output terminal of the shift register.

13. The shift register of claim 12, wherein the reset module comprises a thirteenth transistor, a fourteenth transistor, a sixth control signal terminal and a reset signal terminal;
wherein a first terminal of the thirteenth transistor and a first terminal of the fourteenth transistor are both electronically connected to the reset signal terminal, a control terminal of the thirteenth transistor and a control terminal of the fourteenth transistor are both electronically connected to the sixth control signal terminal, a second terminal of the thirteenth transistor is electronically connected to the first node, and a second terminal of the fourteenth transistor is electronically connected to the output terminal of the shift register.

14. A driving method for driving a shift register comprising a scan control module, an output module, a pull-down module, a turn-off restoring module and a touch control module; wherein the turn-off restoring module is electronically connected to the scan control module at a first node, and is electronically connected to the touch control module and the output module at a second node; and wherein the turn-off restoring module controls the first node to be electrically insulated from the second node during a touch scan phase; the driving method comprising:
during the touch scan phase, latching a potential of the first node, and electrically insulating the first node from the second node;
outputting a touch scan signal; and
restoring a potential of the second node to a potential of the second node at a time instant before the touch scan phase according to the potential of the first node.

15. A display device, comprising an array substrate, wherein the array substrate comprises a pixel element array and a gate driving circuit configured to drive the pixel element array, wherein the gate driving circuit comprises a shift register comprising a scan control module, an output module, a pull-down module, a turn-off restoring module and a touch control module; wherein the turn-off restoring module is electronically connected to the scan control module at a first node, and is electronically connected to the touch control module and the output module at a second node; and wherein the turn-off restoring module controls the first node to be electrically insulated from the second node during a touch scan phase.

* * * * *